(12) United States Patent
Morimoto et al.

(10) Patent No.: US 10,551,177 B2
(45) Date of Patent: Feb. 4, 2020

(54) APPARATUS AND METHOD FOR MEASURING 3D FORM OR DEFORMATION OF AN OBJECT SURFACE USING A GRID PATTERN AND REFERENCE PLANE

(71) Applicant: 4D SENSOR INC., Wakayama (JP)

(72) Inventors: Yoshiharu Morimoto, Wakayama (JP); Yoshiyuki Kusunoki, Wakayama (JP); Masaki Ueki, Wakayama (JP); Akihiro Masaya, Wakayama (JP); Akifumi Takagi, Wakayama (JP)

(73) Assignee: 4D SENSOR INC., Wakayama (JP)

( * ) Notice: Subject to any disclaimer, the term of this patent is extended or adjusted under 35 U.S.C. 154(b) by 0 days.

(21) Appl. No.: 15/100,460

(22) PCT Filed: Apr. 6, 2016

(86) PCT No.: PCT/JP2016/061324
§ 371 (c)(1),
(2) Date: May 31, 2016

(87) PCT Pub. No.: WO2017/175341
PCT Pub. Date: Oct. 12, 2017

(65) Prior Publication Data
US 2018/0094918 A1 Apr. 5, 2018

(51) Int. Cl.
*G01B 11/25* (2006.01)
*G06T 7/521* (2017.01)
*G01B 11/16* (2006.01)
*G01B 11/00* (2006.01)

(52) U.S. Cl.
CPC ........ *G01B 11/2513* (2013.01); *G01B 11/005* (2013.01); *G01B 11/165* (2013.01);
(Continued)

(58) Field of Classification Search
CPC ............ G01B 11/2513; G01B 11/2522; G01B 11/005; G01B 11/254;
(Continued)

(56) References Cited

U.S. PATENT DOCUMENTS

| 5,361,312 A | 11/1994 | Kuchel |
| 5,668,631 A * | 9/1997 | Norita ................ G01B 11/2518 250/559.22 |

(Continued)

FOREIGN PATENT DOCUMENTS

| EP | 1 251 327 A1 | 10/2002 |
| JP | 7-260451 | 10/1995 |

(Continued)

OTHER PUBLICATIONS

Arai, Y. and Kurata, T., "High-Speed and High Resolutive-Moiré Topography by the Method of Fringe Scanning Interferometry," Optics, vol. 15, No. 5, pp. 402-406 (1986).

(Continued)

*Primary Examiner* — Michael P LaPage
(74) *Attorney, Agent, or Firm* — Staas & Halsey LLP

(57) ABSTRACT

A measurement method for selecting a rectangle from a grid image that has been projected on a surface of an object or that has been gained by taking an image of a grid drawn on the surface of an object, inputting an image in a state where the optical system has been adjusted in such a manner that the grid phase of the above-described projected grid image or the above-described drawn grid is gained by dividing 2mπ (m is an integer) by Mx×Ny within the rectangle, sampling a rectangular region made up of Mx pixels in the x direction and Ny pixels in the y direction of the above-described grid image or an image of the above-described (Continued)

grid from the above-described inputted image, and finding a phase on the basis of the brightness of pixels in the above-described rectangular region.

9 Claims, 13 Drawing Sheets

(52) U.S. Cl.
CPC ........ *G01B 11/254* (2013.01); *G01B 11/2522* (2013.01); *G01B 11/2536* (2013.01); *G06T 7/521* (2017.01); *G06T 2207/10152* (2013.01); *G06T 2207/30164* (2013.01)

(58) Field of Classification Search
CPC ..... G01B 11/25–11/2545; G06T 7/521; G06T 2207/30164; G06T 2207/10152
See application file for complete search history.

(56) References Cited

U.S. PATENT DOCUMENTS

| | | | |
|---|---|---|---|
| 6,940,608 B2* | 9/2005 | Sakita | G01B 11/254 250/237 G |
| 9,886,764 B2* | 2/2018 | Zhao | H04N 5/37206 |
| 10,126,252 B2* | 11/2018 | Haugen | G01N 21/956 |
| 2002/0135751 A1* | 9/2002 | Steinbichler | G01B 11/162 356/35.5 |
| 2003/0016366 A1 | 1/2003 | Takeda et al. | |
| 2004/0246496 A1* | 12/2004 | Yoshida | G01B 11/2527 356/605 |
| 2008/0075328 A1* | 3/2008 | Sciammarella | G01B 11/25 382/108 |
| 2009/0190139 A1* | 7/2009 | Fisher | G01B 11/2518 356/613 |
| 2010/0302364 A1* | 12/2010 | Kim | G01B 11/2531 348/136 |
| 2012/0154576 A1* | 6/2012 | Weston | G01B 11/007 348/136 |
| 2015/0049331 A1 | 2/2015 | Ri | |
| 2016/0161249 A1 | 6/2016 | Ri | |
| 2017/0102228 A1 | 4/2017 | Morimoto et al. | |
| 2017/0248413 A1* | 8/2017 | Ohyama | G01B 11/2513 |

FOREIGN PATENT DOCUMENTS

| | | |
|---|---|---|
| JP | 2002-303512 | 10/2002 |
| JP | 2006-64590 | 3/2006 |
| JP | 2006-330771 | 12/2006 |
| JP | 2008-46037 | 2/2008 |
| JP | 2008-281491 | 11/2008 |
| JP | 2009-264852 | 11/2009 |
| JP | 2011-174874 | 9/2011 |
| WO | 2016/001986 A1 | 1/2016 |

OTHER PUBLICATIONS

Morimoto, Y., Fujigaki, M. and Yoneyama, S., "Recent Studies on Shape and Deformation Measurements by Moiré Method and Grid Method," Non-Destructive Inspection 52-3 (2003), pp. 116-121.

Ri, S., Morimoto, Y. and Fujigaki, M., "Non-Contact Measurement of the Displacement Distribution of a Structure in Accordance with a Sampling Moire Method," Inspection Technology, Japan Industrial Publishing Co., Ltd., 14 (5), (2009), pp. 1-6.
Takeda, M. and Mutoh, K., "Fourier Transform Profilometry for the Automatic Measurement of 3-D Object Shapes," Applied Optics, vol. 22, No. 24, pp. 3977-3982 (1983).
Morimoto, Y., Seguchi, Y. and Higashi, T., "Two-Dimensional Moire Method and Grid Method Using Fourier Transform," Experimental Mechanics, vol. 29, No. 4, pp. 399-404 (1989).
Fujigaki, M. and Morimoto, Y., "Shape Measurement with Grating Projection Using Whole-Space Tabulation Method," Experimental Mechanics, vol. 8, No. 4, pp. 92-98 (2008).
Ruowei Gu et al., "Talbot projected 3-D profilometry by means of one step phase-shift algorithms", International Symposium on Optical Fabrication, Testing, and Surface Evaluation, vol. 1720, SPIE, Oct. 20, 1992, pp. 470-477.
Malgorzata Kujawinska et al., "Spatial-carrier phase shifting technique of fringe pattern analysis", Industrial Applications of Holographic and Speckle Measuring Techniques, vol. 1508, SPIE, Oct. 1, 1991, pp. 61-67.
Katherine Creath et al., "N-point Spatial Phase-measurement Techniques for Non-destructive Testing", Optics and Lasers in Engineering, vol. 24, No. 5-6, Elsevier Science Limited., May 1996, pp. 365-379.
International Search Report dated Sep. 2, 2014, in corresponding International Application No. PCT/JP2014/067419.
U.S. Office Action dated Apr. 26, 2018 from U.S. Appl. No. 14/906,987.
Extended European Search Report dated Feb. 3, 2017 in corresponding European Patent Application No. 14896934.8.
Yves Surrel et al., "Simultaneous u-v displacement field measurement with a phase-shifting grid method", Interferometry '94: Photomechanics, vol. 2342, SPIE, Nov. 30, 1994, pp. 66-75.
Maria Pirga et al., "Two directional spatial-carrier phase-shifting method for analysis of crossed and closed fringe patterns", Optical Engineering, vol. 34, No. 8, SPIE, Aug. 1, 1995, pp. 2459-2466, retrieved from URL: http://opticalengineering.spiedigitallibrary.org/article.aspx?articleid=1073851 on Jan. 24, 2017.
Yves Surrel, "Fringe Analysis", Photomechanics, Topics in Applied Physics, vol. 77, Springer Berlin Heidelberg, Feb. 9, 2000, pp. 55-102.
International Search Report dated Sep. 2, 2014, in corresponding International Application No. PCT/JP2014/067420.
U.S. Corrected Notice of Allowability dated Nov. 15, 2017 from U.S. Appl. No. 14/907,009.
U.S. Office Action dated May 5, 2017 from U.S. Appl. No. 14/907,009.
U.S. Notice of Allowance dated Oct. 31, 2017 from U.S. Appl. No. 14/907,009.
U.S. Appl. No. 14/907,009, filed Jan. 22, 2016, Yoshiharu Morimoto et al., 4D Sensor Inc., (U.S. Pat. No. 9,891,042), (Feb. 13, 2018).
Japanese Office Action dated Nov. 13, 2018 from Japanese Patent Application No. 2015-535637, 5 pages.
U.S. Notice of Allowance dated Dec. 5, 2018 from U.S. Appl. No. 14/906,987.
U.S. Appl. No. 14/906,987, filed Jan. 22, 2016, Yoshiharu Morimoto et al., 4D Sensor Inc.
Extended European Search Report dated Oct. 11, 2019 from European Patent Application No. 16723924.3, 9 pages.

* cited by examiner

APPARATUS AND METHOD FOR MEASURING 3D FORM OR DEFORMATION OF AN OBJECT SURFACE USING A GRID PATTERN AND REFERENCE PLANE

CROSS-REFERENCE TO RELATED APPLICATIONS

This application is a U.S. national stage application of PCT/JP2016/061324 filed Apr. 6, 2016, the contents of all of which are incorporated herein by reference.

TECHNICAL FIELD

The present invention relates to a three-dimensional form measuring apparatus for carrying out the measurement of the three-dimensional form on the surface of an object to be measured having a three-dimensional surface form such as large-scale structures, industrial products, sheet-like structures, human bodies, animals and plants as well as natural formations in a non-contact manner, at a high speed and with high precision. The invention can also be used for the measurement of the location of a vibration plane or the non-contact measurement of a displacement distribution.

BACKGROUND ART

A grid projection method has been publicly known, according to which a grid pattern is projected on an object to be measured, and a phase of each pixel of the grid pattern image that has been gained by imaging the grid pattern projected on the object to be measured is found, and thereby, the measurement of a three-dimensional form is carried out.

FIG. 1 shows an example of an optical system for an apparatus for measuring a form in accordance with a one-dimensional grid projection method.

The height of the center of the camera lens and the height of the light source of the projector are the same relative to the reference plane, and the camera imaging plane and the grid plane are in the optical system for a moire topography, which is parallel to the reference plane. In the case of this figure, the pitch of the projected grid and the pitch of the pixels that are imaged on the reference planes are the same in the position of the reference plane, and white lines can be imaged as contour lines in the W positions in FIG. 1, and black lines can be imaged as contour lines in the B positions. Even when the pitch of the pixels of the camera is smaller, the number of pixels in the pitch of the image of the projected grid is constant at any height.

In accordance with the grid projection method, phases of a grid can be analyzed so that the deformation of the grid can be analyzed with high precision, and thus, out-of-plane deformation and a three-dimensional form can be measured with high precision. A phase shift method and a Fourier transform method have been used as conventional phase analysis methods.

PRIOR ART DOCUMENTS

Non-Patent Document 1: Arai, Y. and Kurata, T., "High-Speed Moire Topography with High Precision Using a Technique with a Fringe Scanning Interferometer," Optics, Vol. 15, No. 5, pp. 402-406 (1986)
Non-Patent Document 2: Morimoto, Y., Fujigaki, M. and Yoneyama, S., "Recent Research on Form/Deformation Measurement in Accordance with Moire Method/Grid Method," Non-Destructive Inspection 52-3 (2003), pp. 116-121
Non-Patent Document 3: Ri, S., Morimoto, Y. and Fujigaki, M., "Non-Contact Measurement of the Displacement Distribution of a Structure in Accordance with a Sampling Moire Method," Inspection Technology, Japan Industrial Publishing Co., Ltd., 14 (5), (2009), pp. 1-6
Non-Patent Document 4: Takeda, M. and Mutoh, K., "Fourier Transform Profilometry for the Automatic Measurement of 3-D Object Shapes," Applied Optics, 22-24, pp. 3977-3982 (1983)
Non-Patent Document 5: Morimoto, Y., Seguchi, Y. and Higashi, T., "Two-Dimensional Moire Method and Grid Method Using Fourier Transform," Experimental Mechanics, Vol. 29, No. 4, pp. 399-404 (1989)
Non-Patent Document 6: Fujigaki, M. and Morimoto, Y., "Grid Projection Three-Dimensional Form Measurement in Accordance with a Technique for Converting the Entire Space to a Table," Experimental Mechanics, Vol. 8-4, pp. 92-98 (2008)

SUMMARY OF THE INVENTION

1. Problem to Be Solved by the Invention

In accordance with a grid projection method or a moire method, phases of a grid are analyzed so that the deformation of an object can be analyzed with high precision, which makes the measurement of in-plane deformation or a three-dimensional form possible with high precision (Non-Patent Documents 1 and 2). A phase shift method and a Fourier transform method have been used as conventional phase analysis methods. From among these, a sampling moire method (Non-Patent Document 3) and a Fourier transform method (Non-Patent Documents 4 and 5) allow for the analysis of phases with one image, and therefore are useful for the analysis of a moving object and the like.

A high-speed calculation is necessary in order to measure a moving object in real time, and therefore, it is better to carry out phase calculation with as little image data as possible. However, in accordance with the sampling moire method, phase calculation is carried out using data during two periods, whereas in accordance with the Fourier transform method, phase analysis is carried out using data for all the pixels, and thus, measurement cannot be carried out for a moving image with little image data.

Meanwhile, the present applicant has filed a patent application for a new grid projection method for analyzing phases in image data for one period of a grid using Fourier transformation (U.S. Pat. No. 9,891,042 B2) (hereinafter referred to as given technology). This allows for high-speed analysis of a phase distribution with one image, which also makes analysis of a moving image possible.

This given technology is characterized as follows.
(1) Precision is high because of the measurement using phase analysis.
(2) Phase analysis can be carried out with one image, and therefore, form measurement of a moving object is possible.
(3) Only frequency 1 (the frequency as the first frequency; the maximum power spectrum) is sampled in accordance with Fourier transformation, and therefore, it is not necessary to project a grid having a brightness distribution of precise cosine waves.
(4) In addition, only frequency 1 is sampled in accordance with Fourier transformation, and therefore, the noise that appears in high-frequency portions is automatically deleted, and thus, the system is strong against noise.

(5) The process is simple and can be carried out at a high speed.

(6) The gauge length is N pixels, which is shorter than that in the sampling moire method. In general, the gauge length is shorter than that in the digital image correlation method.

(7) In accordance with the sampling moire method, moire fringes are generated from linear interpolation, while in accordance with the present invention, correlation is taken with cosine waves, which makes precision higher.

In accordance with the given technology, however, it is necessary to conduct phase analysis using data of an oblong image having M pixels in the x direction (M is an integer of 2 or greater) and one pixel in the y direction. Therefore, the space resolution in the x direction is not sufficient, which makes an error great over a wide range in a portion having a large change in the phase such as a portion with a step in the x direction.

An object of the present invention is to provide a phase analysis method according to which the space resolution can be made small to almost the same degree in the x and y directions by using data for a two-dimensional region having Nx pixels in the x direction and Ny pixels in the y direction (Nx and Ny are an integer of 2 of greater), where the number of pixels for phase analysis is the same as in the above-described given technology, so that the width of a portion having a large error can be made narrow even in a portion with a step, and to provide an apparatus using the above-described phase analysis method.

2. Means for Solving Problem

The present invention provides a measurement method for selecting a rectangle made up of Nx pixels in the x direction and Ny pixels in the y direction (Nx and Ny are an integer of 2 or greater) from a grid image that has been projected on a surface of an object or that has been gained by taking an image of a grid drawn on the surface of an object, inputting an image in a state where the optical system has been adjusted in such a manner that the grid phase of the above-described projected grid image or the above-described drawn grid is gained by dividing 2mπ (m is an integer) by Nx×Ny within the rectangle, sampling a rectangular region made up of Nx pixels in the x direction and Ny pixels in the y direction of the above-described grid image or an image of the above-described grid from the above-described inputted image, and finding a phase on the basis of the brightness of pixels in the above-described rectangular region.

In addition, the present invention provides a measurement method, including the steps of: taking an image of a grid that has been projected on a reference plane; adjusting the optical system so that the phase of the projected grid image is gained by dividing 2mπ (m is an integer) by Nx×Ny (=M) (Nx and Ny are an integer of 2 or greater) within a rectangle made up of Nx pixels in the x direction and Ny pixels in the y direction of the above-described image of a grid that has been projected on the above-described reference plane; taking a grid image formed on an object that has been placed on the above-described reference plane; gaining a brightness value by dividing 2mπ by Nx×Ny in the rectangular region of Nx×Ny pixels made up of Nx pixels in the x direction and Ny pixels in the y direction of an image that is gained by taking a grid image formed on the above-described object; and finding a phase using the above-described brightness value.

Furthermore, the present invention provides a measurement method, including the steps of: taking an image of a grid drawn on an object before deformation; adjusting the optical system so that the phase of a grid that has been drawn on the above-described object is gained by dividing 2mπ (m is an integer) by approximately Nx×Ny (=M) (Nx and Ny are an integer of 2 or greater) within a rectangle made up of Nx pixels in the x direction and Ny pixels in the y direction of an image gained by taking an image of the above-described drawn grid; taking an image of a pattern of the grid drawn on the above-described object after deformation; gaining a brightness value by dividing 2mπ by approximately Nx×Ny in a rectangular region of Nx×Ny pixels made up of Nx pixels in the x direction and Ny pixels in they direction of an image that is gained by taking an image of the pattern of the grid drawn on the above-described object after deformation; finding the phase before deformation in the above-described rectangular region using the above-described brightness value before deformation of the above-described object; and finding the displacement of the surface of the object on the basis of the difference in the phase before and after deformation of the object.

In the step of gaining the above-described brightness value, the above-described phase may be found by shifting the above-described rectangular region for each pixel of the image that is gained by taking a grid image projected on the above-described object.

In the step of gaining the above-described brightness value, the above-described phase may be found by shifting the above-described rectangular region for each pixel of the image that is gained by taking an image of the grid drawn on the above-described object.

In the present invention, the location of the surface of an object may be found on the basis of the above-described phase by using a technique for converting the entire space to a table.

The measurement method according to the present invention may further include the steps of: providing grids having different pitches that are greater than one pixel in the x direction or in the y direction so as to find a phase value on the basis of the above-described grids having different pitches that are greater than one pixel; and carrying out phase unwrapping using the phase that has been found on the basis of the grids having different pitches.

The present invention may provide a measurement apparatus for finding a phase on the basis of the above-described brightness value.

The present invention may provide a measurement program for implementing any of the above-described measurement methods.

The present invention may provide a computer-readable recording medium, wherein the above-described measurement program is stored.

3. Effects of the Invention

The present invention can provide a phase analysis method according to which the space resolution can be made small to approximately the same degree in the x and y directions by using data for a region of Nx pixels in the x direction and Ny pixels in the y direction (Nx and Ny are integers) so that the width of a portion having a large error even in a portion with a step can be made narrow when the same number of pixels is used for phase analysis.

The phase analysis method according to the present invention is applicable for a one-dimensional displacement (and deformation) analysis method for in-plane deformation.

In the case of in-plane displacement, the difference in the phase before and after deformation corresponds to displacement. Though the conventional sampling moire method and the given technology have a poor space resolution in the x direction, the space resolution can be made small to the same degree in the x and y directions according to the present invention.

PREFERRED EMBODIMENTS OF THE INVENTION

The present invention overcomes the problem to be solved by the invention, and thus can provide a high-speed method with high precision. The present invention provides a measurement method for analysis by taking an image of a grid on the surface of an object with a camera. The present invention relates to a phase analysis method according to which it is possible to find a phase value with high precision on the basis of the brightness data of a grid image projected on an object or an image of a grid drawn on an object. Thus, the form of the surface of an object can be measured by measuring the height of the surface of the object on the basis of the phase found with high precision, and in addition, the displacement of the surface of an object in the in-plane direction can be measured by taking an image of a grid pattern provided on the surface of the object with a camera.

In the following, preferred embodiments of the present invention are described.

First Embodiment

First, the measurement principle of the present invention is described.

The present invention provides a method for analyzing the phase from the brightness data of M pixels so that information on the height or the like can be gained from the phase by utilizing the fact that the pitch of the grid image always consists of a constant number of pixels, that is M pixels, when a one-dimensional grid is projected in accordance with a grid projection method.

<Optical System and Coordinates>

Figure 2:
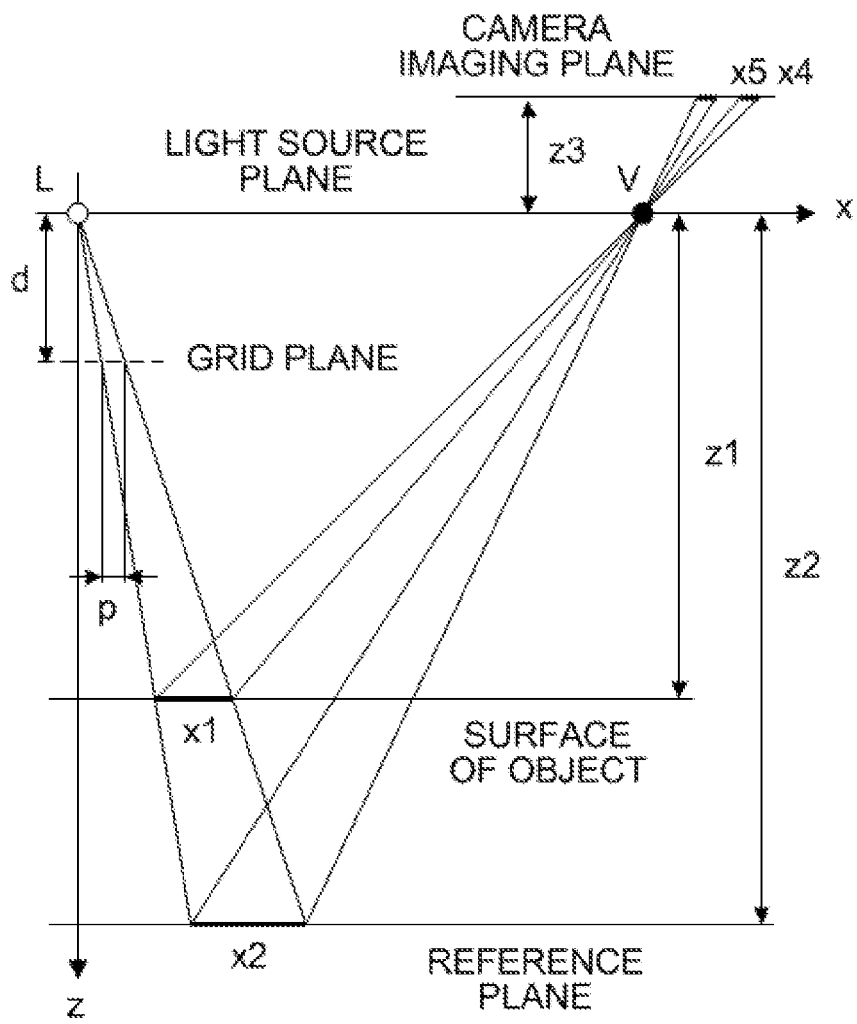
FIG. 2 is a diagram showing an optical system for a moire topography.
Figure 3A:
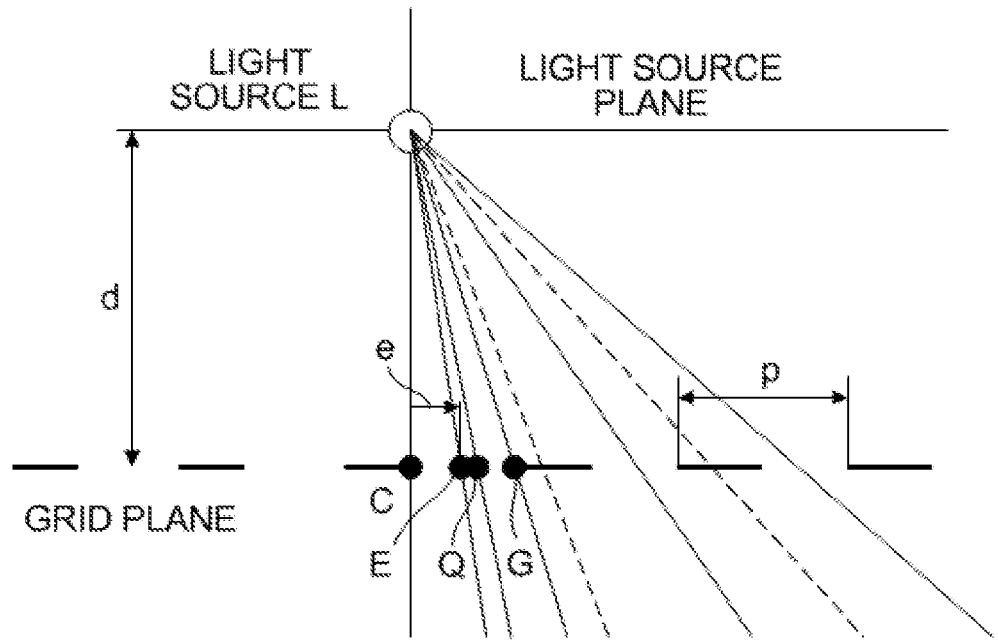
FIG. 3A is a diagram showing the relationship between the phase of an object viewed by one pixel on the camera imaging plane and the phase on the reference plane.
Figure 3B:
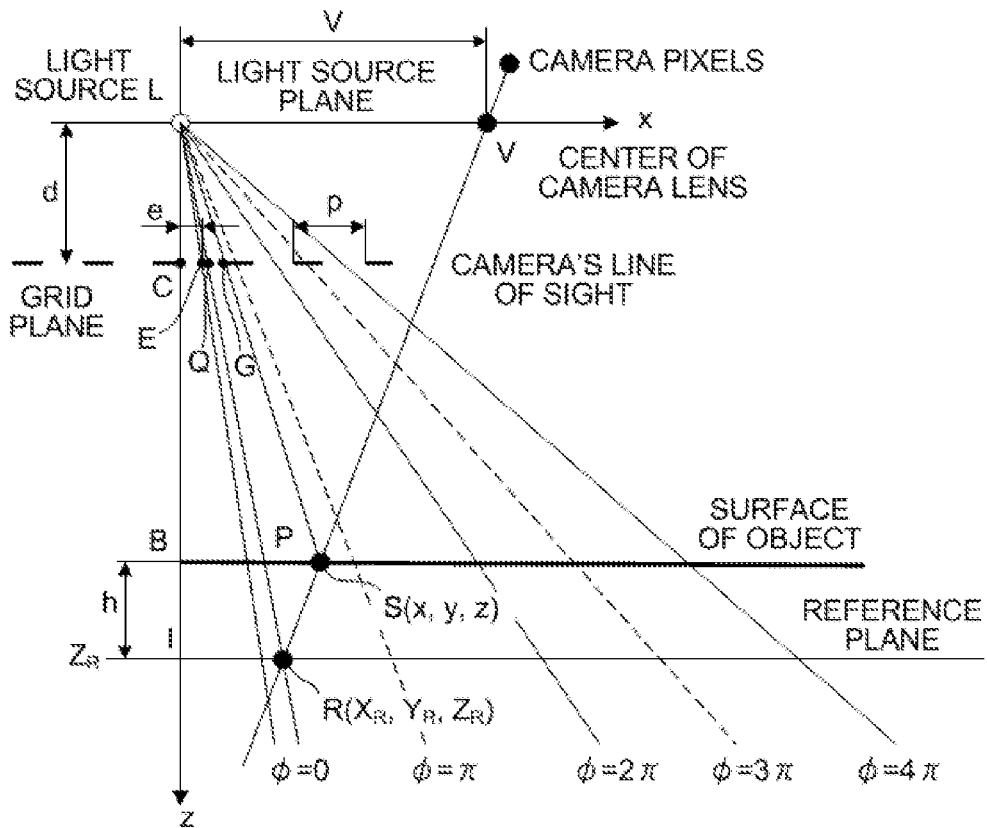
FIG. 3B is a diagram showing the relationship between the phase of an object viewed by one pixel on the camera imaging plane and the phase on the reference plane.

FIGS. 2, 3A and 3B are schematic diagrams showing the grid projection mechanism of a form measuring apparatus and an object to be measured.

First, the optical system of a moire topography is further described in reference to FIG. 2.

L is the location of a light source, and V is the center of a camera lens. A grid is located at a distance d from the location L of the light source, where the width of one period is p.

In this optical system, the center V of the camera lens and the light source L of the projector are at the same height relative to the reference plane, and the camera imaging plane and the grid plane are parallel to the reference plane.

The surface of the object is located at a distance z1 from the light source L, the reference plane is located at a distance z2 from the light source L, and the grid plane is located at a distance d from the light source L. One-dimensional grid lines are drawn at equal intervals of which the period is p on the grid plane that is parallel to the reference plane. A point light source is used as the light source, but a single line light source that is parallel to the grid lines may be used.

The plane that includes the light source L and is parallel to the reference plane is referred to as the light source plane. For the purpose of description, the x, y and z coordinates are set with the light source being the point of origin, and the direction perpendicular to the reference plane is set as the z direction. In FIG. 2, the downward direction is the positive direction in the z direction.

The direction that is perpendicular to the grid lines drawn on the surface of the grid is the x direction, and the direction parallel to the grid lines is the y direction. The center of the camera lens is within the light source plane and is at a distance v from the light source L in the x direction. The camera imaging plane is parallel to the reference plane and the grid plane, and the i direction and the j direction of the pixel coordinates (i, j) on the camera imaging plane correspond to the x direction and the y direction, respectively.

In this optical system, an image on the camera imaging plane with one period of the grid has the same width at whichever height the surface of the object or the reference plane is. Accordingly, an image with one period of the grid is reflected on N pixels at whichever height the surface of the object or the reference plane is when one period of the grid is set to be reflected on N pixels on the digital camera imaging plane. This can be described as follows in reference to FIG. 2.

The shadow of the projected grid with one period becomes x1 on the surface of the object and x2 on the reference plane. The distance from the light source plane is z1 on the surface of the object, z2 in the reference plane, z3 on the camera imaging plane and d on the grid plane.

The shadow of the grid with one period p becomes x1, which is p times z1/d, on the surface of the object and becomes x2, which is p times z2/d, in the reference plane. The size on the camera imaging plane x4 is x1 times z3/z1, and x5 has the size of x2 times z3/z2, and therefore, x4 and x5 are both p times z3/d. That is to say, the size of one period of the grid reflected on the camera imaging screen is determined by the ratio of the distance between the light source plane and the grid to the distance between the center of the camera lens and the camera imaging plane and is not affected by the distance to the surface of the object or to the reference plane.

As a result, the number of sensor pixels of the camera that takes an image with one period of the grid becomes constant irrelevant of the height of the object to be measured relative to the reference plane. That is to say, one period of the grid is always reflected on the sequential N pixels when one period of the grid is set to be reflected on N pixels.

Figure 1:
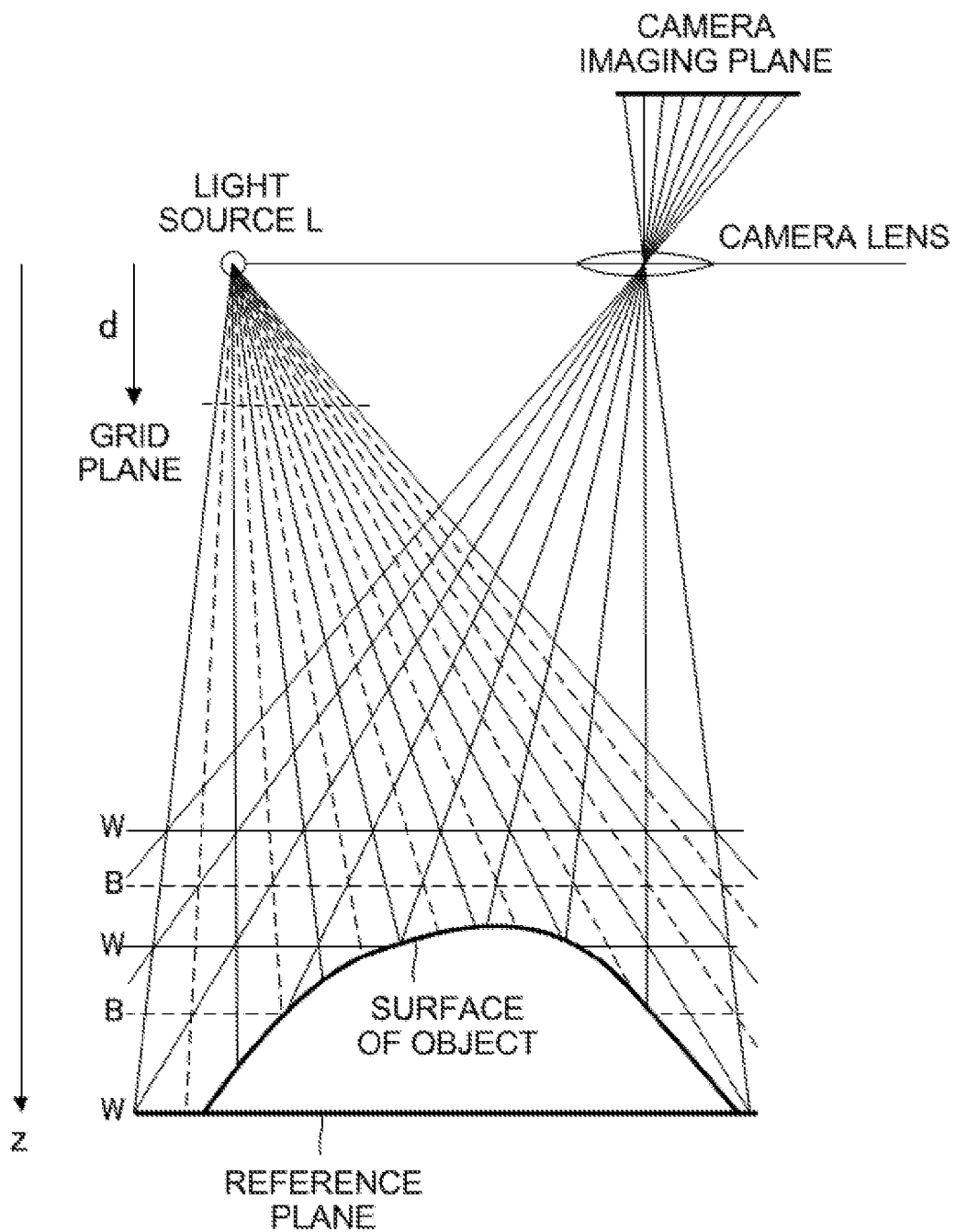
FIG. 1 shows an optical system (moire topography) for a grid projection method.

Meanwhile, as can be seen from the fact that the locations of x4 and x5 are shifted in FIG. 1, the location where the grid is reflected on the camera imaging plane changes as the distance to the surface of the object or to the reference plane changes. In other words, the phase of the grid reflected on the pixels on the camera imaging plane changes depending on the height of the surface of the object relative to the reference plane.

Thus, the height can be found through phase analysis. That is to say, the N pixels can be Fourier transformed, the frequency 1 having the maximum power spectrum can be sampled, and the phase of the frequency 1 can be found in order to measure the height of the surface of the object. In addition, depending on the optical system where actual measurement is carried out, the above-described frequency can be preset, and then the phase of the preset frequency can be found in order to measure the height of the surface of an object.

As described above, it is preferable for the magnification of the lens to be adjusted so that one period of the grid projected on the reference plane corresponds to N pixels of the digital camera.

Next, a method for finding the height of the surface of an object relative to the reference plane is described in reference to FIG. 3.

FIG. 3A shows an enlargement of the upper portion in FIG. 3B.

First, the center V of the camera lens is placed at coordinates (v, 0, 0) along the x axis. That is to say, the center V of the camera lens is at a distance v from the light source L. The point S on the surface of an object is reflected on a pixel on the camera imaging plane on which the point R in the reference plane is reflected when the object is placed. FIG. 3B shows the line that passes this pixel, the point S and the point R as the camera's line of sight. The point S on the surface of the object is projected vertically to the z axis at point B, and the point R in the reference plane is projected vertically to the z axis at point I. In addition, the light beam from the light source at location L towards the point R passes through the grid plane at point Q, and the light beam from the light source at location L towards the point R crosses at point P the line along which the point S on the surface of the object is projected vertically to the z axis. Furthermore, the light beam from the light source at location L towards the point S passes through the grid plane at point G. The z axis and the grid plane cross at point C. The point of origin of the grid is point E, and the distance between point C and point E is e. Moreover, the distance between point I and point B, that is to say, the height of the surface of the object relative to the reference plane, is h.

<Phase of Projected Grid>

Now, the transmissivity distribution $I_g$ of the grid at $z=d$ is in a cosine state that can be represented by the following formula.

$$I_g = a_g \cos\{\Phi\} + b_g = a_g \cos\left\{\frac{2\pi}{p}(x_g - e)\right\} + b_g \quad \text{[Formula 1]}$$

Here, $a_g$ is the amplitude, $\Phi$ is the phase of the grid, and $b_g$ is the background. The light source illuminates the grid so that the shadow of the grid is projected in the reference plane or on the surface of the object. When the shadow of the grid is reflected on the camera imaging plane, the brightness distribution can be represented by the following formula for the sequential N pixels that correspond to one period of the grid at the height z of the reference plane or the surface of the object.

$$I_n = a_g \frac{d^2}{z^2} \cos\left\{\frac{2\pi}{p}\left(\frac{d}{z}x + \frac{np}{N} - e\right)\right\} + b_g \frac{d^2}{z^2} \quad \text{[Formula 2]}$$

Here, n=0, 1, . . . N.

Formula 2 can be replaced with Formula 6 when a, b and $\Theta_n$ in Formulas 3 through 5 are substituted into Formula 2.

$$a = a_g \frac{d^2}{z^2} \quad \text{[Formula 3]}$$

$$b = b_g \frac{d^2}{z^2} \quad \text{[Formula 4]}$$

$$\Theta_n = \frac{2\pi}{p}\left(\frac{d}{z}x + \frac{np}{N} - e\right) \quad \text{[Formula 5]}$$

$$I_n = a \cos \Theta_n + b \quad \text{[Formula 6]}$$

The camera lens is adjusted so that one period of the shadow of the grid in the x direction can be reflected on the sequential N pixels on the camera imaging plane from the location S (x, y, z) on the surface of the object.

Thus, a discrete Fourier transform can be carried out on the N pieces of data so as to sample the frequency 1, from which the phase can be found, so that the phase e of smooth cosine waves can be gained, and thus, phase analysis with very high precision can be carried out.

This phase θ ($-\pi<\theta\leq\pi$) can be calculated using the following formula.

$$\frac{\sum_{k=0}^{N-1} I_k \sin\left(k\frac{2\pi}{N}\right)}{\sum_{k=0}^{N-1} I_k \cos\left(k\frac{2\pi}{N}\right)} = -\tan\theta \qquad \text{[Formula 7]}$$

The phase θ can be found as described above for all the pixels in the x direction for the phase unwrapping in the x direction so that the phase Θ of the grid can be gained.

<Phase of Moire Rings Representing Contour Lines>

In a moire topography, the phase $\Theta_M$ of the moire rings representing contour lines can be found as the difference $\Theta_M = \Theta - \Theta_R$ between the phase $\Theta_R$ of the grid projected on the reference plane and the phase Θ of the grid projected on the object. As a result, z can be found or the height relative to the reference plane $h = z_R - z$.

This calculation formula can be found as follows.

The phase $\Theta_R$ of the shadow of the grid projected at point R in the reference plane can be found in the following formula.

$$\Theta_R = \frac{2\pi}{p}\left\{\frac{d}{z_R}x_R - e\right\} \qquad \text{[Formula 8]}$$

Here, the similarity between ΔLIR and ΔLCQ leads to the following formula.

$$x_R = \frac{z_R}{d}x_Q \qquad \text{[Formula 9]}$$

Formula 9 can be substituted into Formula 8 so as to gain the following formula.

$$\Theta_R = \frac{2\pi}{p}\{x_Q - e\} \qquad \text{[Formula 10]}$$

Likewise, the similarity between ΔLBS and ΔLCG can be used so as to find the phase $\Theta_S$ of the shadow of the grid projected at point S on the object as follows.

$$\Theta_S = \frac{2\pi}{p}\left\{\frac{d}{z_S}x_S - e\right\} \qquad \text{[Formula 11]}$$
$$= \frac{2\pi}{p}\left\{\frac{d}{z_S}\frac{z_S}{d}x_G - e\right\}$$
$$= \frac{2\pi}{p}\{x_G - e\}$$

The phase $\Theta_M$ of the moire rings can be gained in the following formula as the difference between the phase of point R in Formula 10 and the phase of point S in Formula 11.

$$\Theta_M = \Theta_S - \Theta_R \qquad \text{[Formula 12]}$$
$$= \frac{2\pi}{p}(x_G - x_Q)$$

Meanwhile, the similarity between two triangles ΔLPS and ΔLQG leads to the following formula.

$$x_G - x_Q = (x_S - x_P)\frac{d}{z_S} \qquad \text{[Formula 13]}$$

In addition, the similarity between ΔRLV and ΔRPS leads to the following formula.

$$x_S - x_P = v\frac{z_R - z_S}{z_R} \qquad \text{[Formula 14]}$$

Thus, the following formula is gained.

$$\Theta_M = \frac{2\pi}{p}(x_G - x_Q) = \frac{2\pi}{p}(x_S - x_P)\frac{d}{z_S} \qquad \text{[Formula 15]}$$
$$= \frac{2\pi}{p}v\frac{z_R - z_S}{z_R}\frac{d}{z_S}$$

As a result, the following formulas are gained.

$$z_s = \frac{2\pi v d z_R}{p z_R \Theta_M + 2\pi v d} \qquad \text{[Formula 16]}$$

$$h = z_R - z_S = z_R - \frac{2\pi v d z_R}{p z_R \Theta_M + 2\pi v d} \qquad \text{[Formula 17]}$$
$$= \frac{p \Theta_M z_R^2}{p z_R \Theta_M + 2\pi v d}$$

As described above, the phase of the moire rings can be measured as the difference in the phase between the grid in the reference plane and the grid on the surface of the object so that the height h of the surface of the object relative to the reference plane can be found.

Here, a method for measuring the form of the surface of an object by finding the height of the surface of the object is described.

Figure 4:
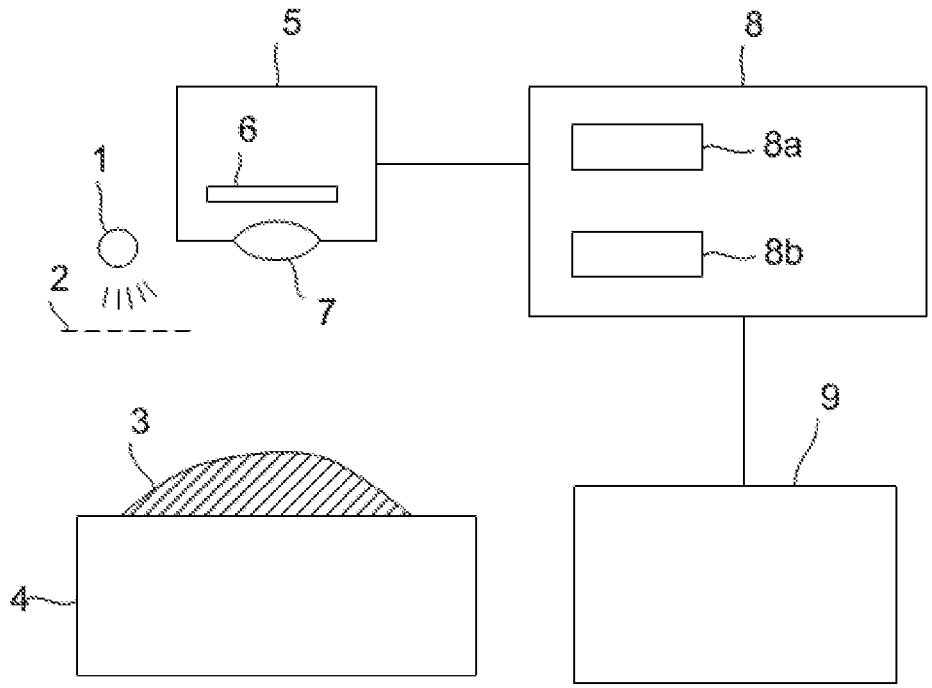
FIG. 4 shows the entire configuration of the apparatus for reference.

FIG. 4 shows the entire configuration of a measurement apparatus.

1 is a lamp such as an LED, which corresponds to the light source. 2 is a grid, 3 is an object to be measured, 4 is a base, 5 is a digital camera, 6 is an image sensor, 7 is a lens, 8 is a computer, and 9 is an output unit. In order to merely gain the measurement results, the results can be stored in the computer 8, and thus, the output unit 9 is not necessary. In addition, a projector such as a commercially available liquid crystal projector can be used as the lamp 1 and the grid 2. In this case, the grid 2 is formed by displaying a grid using liquid crystal display elements. When a projector is used, the width and the direction of the grid can be freely changed.

When the object 3 is illuminated with the lamp 1, the shadow of the grid 2 is projected on the surface of the object, and the shadow image is reflected on the image sensor 6 in the digital camera 5 through the lens 7. The reflected image is sent to the computer 8 from the digital camera 5. Thus, the program for implementing the method according to the present invention that is stored in the computer 8 analyzes the image as described above so as to gain the measurement value. The gained measurement value is stored in the computer 8, and at the same time is processed to an output image or the like, if necessary, so as to be sent to and outputted from the output unit 9. Examples of the output unit include a display unit or a printing unit.

It is also possible for the computer 8 to have a memory to store a data table 8a for implementing the below-described technique for converting the entire space to a table. In addition, the program according to the present invention can be run in the computer 8. Furthermore, a recording medium 8b on which the program according to the present invention is recorded can be equipped in the computer 8 so that the measurement method according to the present invention can be carried out.

The reference plane may be on the surface of the base 4 or an object having a reference plane may be placed on top of the base 4. A reference plane and a surface of an object make measurement possible, and therefore, an object having a surface may be placed instead of the reference plane. Moreover, it is possible to place the entire system including the lamp 1, the grid 2, the object 3, the base 4 and the digital camera 5 laterally so that the form of the surface of the object can be measured in the lateral direction. It is also possible to measure in a diagonal direction.

<Procedure for Phase Analysis>

Figure 5:
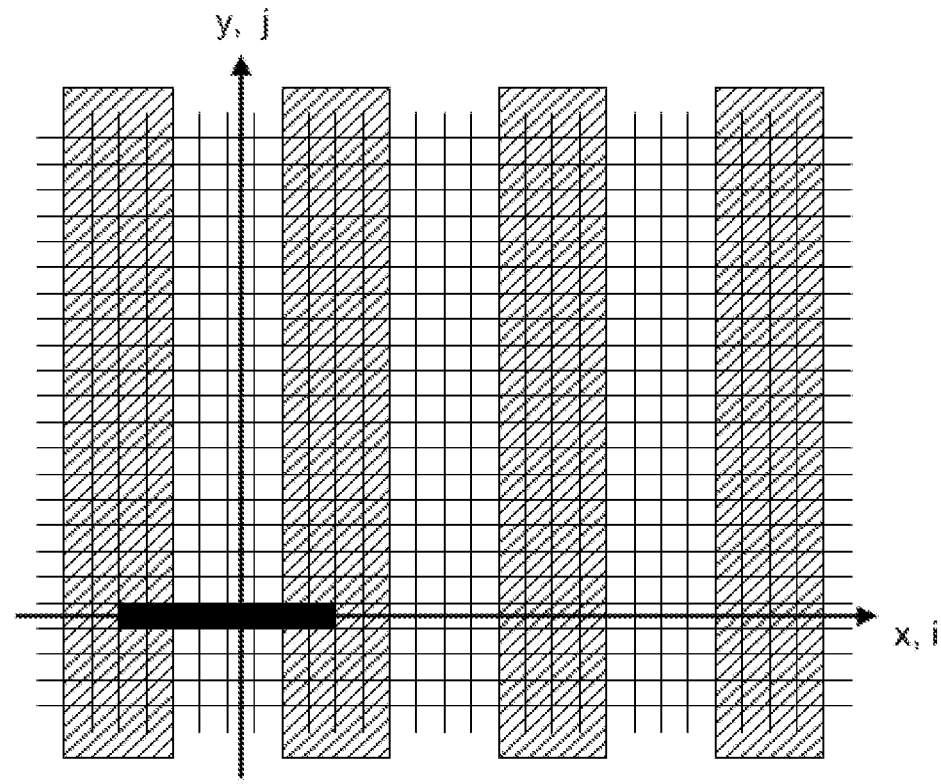
FIG. 5 shows an image of a grid reflected on the camera imaging plane.

A one-dimensional grid is projected on the reference plane. An image of this is taken by a digital camera. FIG. 5 is a diagram showing an enlargement of a portion of the thus-taken image. In the case of this example, the magnification is adjusted so that one period of the grid corresponds to N pixels on the camera imaging plane (here, N=8). A pixel on the camera imaging plane is represented by a black rectangle. The hatched portions in this figure represent portions of the grid of which the brightness is low, and the other portions represent portions of the grid of which the brightness is high. The direction that is orthogonal to the grid lines is the x direction, and the direction perpendicular to this is the y direction. The coordinates of a pixel on the camera imaging plane is (i, j). Thus, an image is taken when the i direction and the j direction correspond to the x direction and the y direction, respectively.

This image is processed as follows.

Figure 6A:
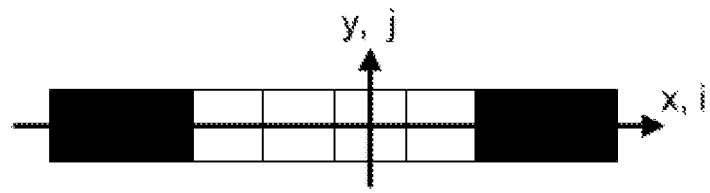
FIG. 6A shows a procedure for processing a grid.
Figure 6B:
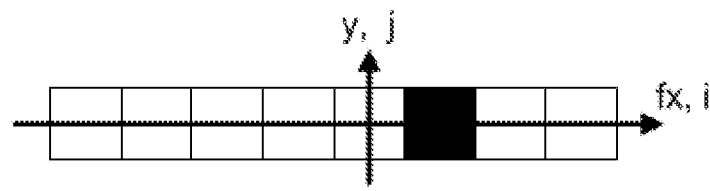
FIG. 6B shows a procedure for processing a grid.
Figure 6C:
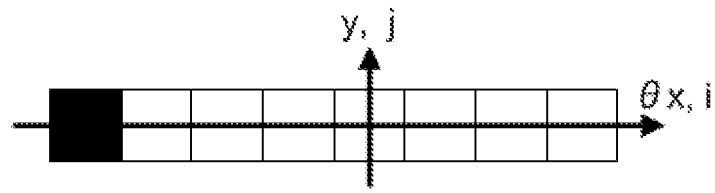
FIG. 6C shows a procedure for processing a grid.

(1) A one-dimensional Fourier transform is carried out on the image data of the sequential N pixels (FIG. 6A).
(2) As a result, a frequency spectrum from −N/2 to N/2 is gained (FIG. 6B). A component with the frequency 1 or the frequency −1 of which one period corresponds to N pixels and having the maximum power spectrum from among this is sampled. In FIG. 6B, only the frequency 1 is taken out.
(3) A phase calculation can be carried out on the thus-sampled frequency in order to gain the phase. Then, the phase is stored so as to correspond to the pixel at the head of the grid of these N pixels (FIG. 6C).
(4) Next, the combination of the N pixels in the grid is shifted by only one pixel in the x direction, and the phase calculation and storage are repeated as in (1) through (3).
(5) After shifting in the x direction is completed, the scanning of (1) through (4) is carried out for all the pixels in the y direction.

In the case where the phase is directly found using Formula 7, the procedure from (1) through (3) is collectively carried out. The thus-gained phases for approximately one screen provide the phase distribution of this grid in the reference plane.

In the case where the phase of the grid on an object is analyzed, the camera is left as it is and an object is placed instead of the reference plane, and thus, the calculations in (1) through (5) are repeated in the same manner. The thus-gained phase distribution is the phase distribution of the surface of the object.

Next, phase unwrapping is respectively carried out for the phases gained on the surface of the object and the phases in the reference plane. In the case of the grid projection method, the phases of the grid basically provide a monotone function. Therefore, phase unwrapping can be easily carried out by increasing or decreasing $2\pi$ when the phase jumps.

After phase unwrapping, the phase $\Theta_M$ of the moire rings that is the difference in the phase between the phase of an object and the phase of the grid in the reference plane is found for each pixel. Thus, the height h can be found using Formula 17. Here, the phase with the frequency 1 is gained after Fourier transform, and therefore, measurement resilient to noise can be carried out without projecting a grid having a brightness distribution in a precise cosine wave.

In accordance with the above-described given technology, phase analysis is carried out using data of an oblong image with N pixels in the x direction and one pixel in the y direction. Therefore, the space resolution in the x direction is poor, which causes a large error over a wide range in a place having a large phase change such as in a place with a step in the x direction.

Therefore, the present invention is provided in order for the space resolution to be made small to approximately the same degree in the x and y directions by using data for a two-dimensional region of Nx pixels in the x direction and Ny pixels in the y direction (Nx and Ny are an integer of 2 or greater) so that the width of a portion having a large error even in a portion with a step can be made narrow when the same number of pixels is used for phase analysis.

Thus, in the optical system of a moire topography, a grid is projected on the reference plane of z=0, and the optical system is adjusted so that the phase of the projected grid is gained by dividing $2\pi$ by Nx×Ny within a rectangle (including a square) made up of Nx pixels in the x direction and Ny pixels in the y direction on the reference plane. As a result, the brightness value that corresponds to the phase gained by dividing $2\pi$ by Nx×Ny is gained for all the positions of the pixels in the rectangular region of Nx×Ny pixels made up of Nx pixels in the x direction and Ny pixels in the y direction, and the phase for each pixel can be found from this brightness data.

In the optical system of a moire topography in FIG. 1, the light beam emitted from the light source L passes through the grid so as to project the shadow of the grid on an object. The camera takes an image of the shadow of the grid that has been warped in accordance with the form of the object.

Figure 7:
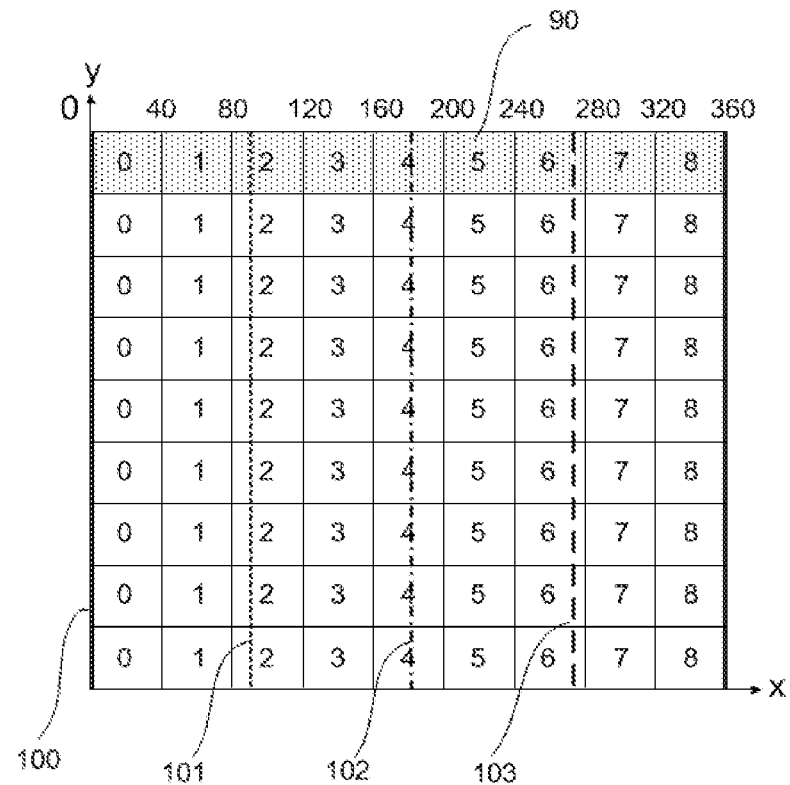
FIG. 7 shows a grid image used in the conventional sampling moire method and in the given technology.

In the optical system according to the given technology, a grid is installed so that one-dimensional grid lines projected on the reference plane are vertical to the x axis as shown in FIGS. 1 and 7, and the optical system is arranged so that the pitch of the grid image taken by the camera is M pixels in the x direction (M=9 in the case of FIG. 7) as shown in FIG. 7. FIG. 7 shows a grid image used in the sampling moire method according to the prior art or in the given technology. The grid provides grid lines that are vertical in the x direction, and the optical system is adjusted so that the pitch is M pixels in the x direction (M=9 in this figure). Phase analysis is carried out using the data of M pixels in the x direction (M=9 in this figure). Phase analysis is carried out using the nine pixels in the region denoted by 90.

Figure 8:
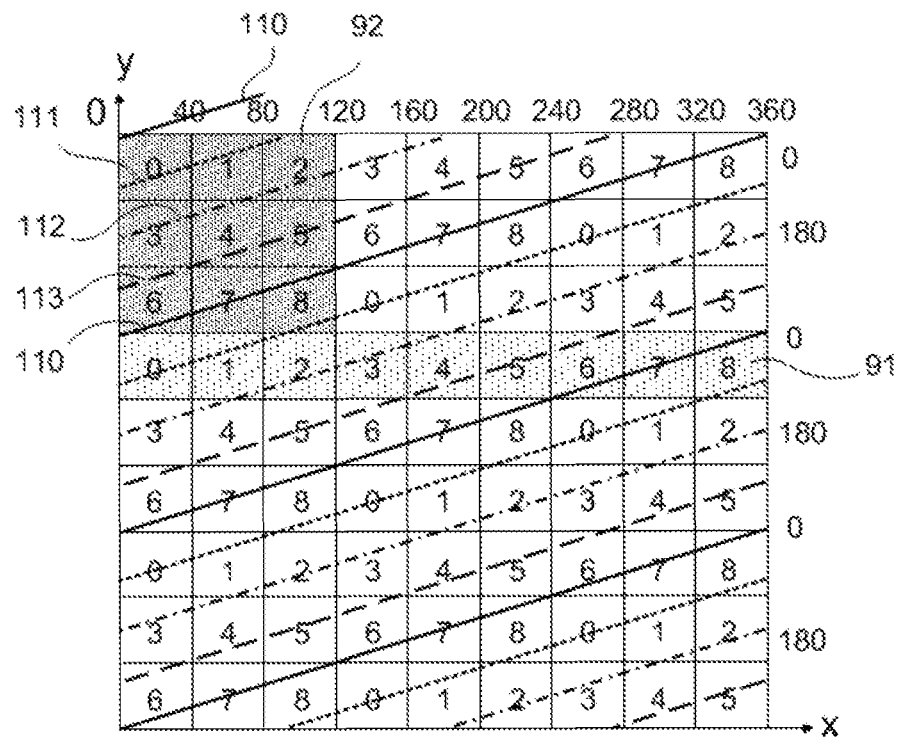
FIG. 8 is a diagram showing the grid image of Example 1 used in the present invention.

Meanwhile, in the optical system according to the present invention, the grid projected on the reference plane is diagonal and not vertical relative to the x axis as shown in FIG. 8. Nevertheless, the system is adjusted so that the pitch of the grid is M pixels in the x direction. Here, it is also adjusted that the pitch of the grid in the y direction is Ny pixels (Nx=3 and Ny=3 in the case of FIG. 8).

As a result, the brightness data of the phases that are gained by dividing the phase of one period by N can be gained as the brightness data of the Nx×Ny region in the case where the optical system is arranged so as to have Nx pixels in the x direction and Ny pixels in the y direction where Nx×Ny=M (M, Nx and Ny are an integer of 2 or greater).

The grid line 100 is a line of phase 0 in the projected grid, the grid line 101 is a line of phase π/2 (90 degrees) in the projected grid, the grid line 102 is a line of phase π (180 degrees) in the projected grid, and the grid line 103 is a line of phase 3π/2 (270 degrees) in the projected grid.

The numeral written in each pixel in FIG. 7 indicates the number of the phase of the projected grid, where 0 indicates phase 0 (0 degrees) and the phase increases incrementally by 2π/(Nx×Ny) as the number increases. In the case of this figure, the phase increases by 2π/9 (40°).

FIG. 8 is a diagram showing the image of Example 1 of the grid image used in the present invention. The grid is projected diagonally with the lines at equal intervals. See the region 91 of M×1 pixels so as to find that the pitch in the x direction is M pixels. The direction of the projected grid is adjusted so that the pitch in the y direction is Ny pixels. That is to say, the direction and the pitch of the grid lines can be well-adjusted so as to find a point where the change in the phase of each pixel in the rectangular region of Nx×Ny can be gained at equal intervals. In FIG. 8, the data of Nx×Ny=M pixels provides a phase change that is gained by dividing 2n by M, and it is possible to use this for phase analysis.

The grid line 110 is a line of phase 0 in the projected grid, the grid line 111 is a line of phase π/2 (90 degrees) in the projected grid, the grid line 112 is a line of phase π (180 degrees) in the projected grid, and the grid line 113 is a line of phase 3π/2 (270 degrees) in the projected grid.

In FIG. 8, the numeral written in each pixel indicates the order of the phase of the projected grid. The numeral written in each pixel in this figure indicates the phase number, where 0 is phase 0 (0 degrees) and the phase increases by 2π/(Nx×Ny) as the number increases. Typically, nine pixels in the x direction and one pixel in the y direction provide one period, where these nine pixels (region 91) make phase analysis possible. Meanwhile, see the three pixels in the x direction and the three pixels in the y direction, which make nine pixels in total (region 92), so as to find that the data of the same phase that is gained by dividing one period by nine has been gained in either direction. Space resolution is three pixels in both the x direction and the y direction, and thus, the same isotropic phase analysis with high precision is possible both in the x direction and in the y direction.

In the case of FIG. 8 as well, the M pixels in the region 91 can be analyzed so as to find a phase. In the same manner, the Nx×Ny (=M) pixels in the region 92 can be analyzed to gain pixel data, which can be analyzed to gain a phase. The length of the region 92 in the x direction is shorter than the length of the region 91 in the x direction, and thus, the region 92 is closer to a square, and therefore, the directionality of space resolution is smaller and a steep step, if any, affects a smaller range.

As shown in FIG. 8, typically, the brightness data of the region 91 having M (=9) pixels in the x direction and one pixel in the y direction and the brightness data of the Nx (=3) pixels in the x direction and the Ny (=3) pixels in the y direction have the same phase arrangement for Nx=3, Ny=3 and M=9. The brightness data of the region 92 instead of the brightness data of the region 91 can be used for analysis in the same manner, and it can be said that space resolution is better when using the brightness data for the region 92 that is closer to a square than the brightness data of an oblong region 91 (this is because the phase is found in the region 91 by using the data of nine pixels in the x direction while the data of only three pixels in the x direction is used in the region 92, which provides better space resolution in the x direction).

Next, M=Nx×Ny pieces of brightness data are taken out from the region of Nx pixels in the x direction and Ny pixels in the y direction of the grid image that has been taken, and the (initial) phase θ is analyzed from these pieces of brightness data using Formula 18.

$$\tan\theta = -\frac{\sum_{n=0}^{M-1} I_n \sin\left(n\frac{2\pi}{M}\right)}{\sum_{n=0}^{M-1} I_n \cos\left(n\frac{2\pi}{M}\right)}$$ [Formula 18]

A process of phase analysis is carried out on each pixel of the gained image. An Nx×Ny pixel region is set around the pixel to be processed, and the respective pieces of brightness data of the pixels in this region are aligned in the order of the phase of each pixel (in the case of FIG. 8, the order of the number written in each pixel), and thus, the phase e is found from these pieces of brightness data using Formula 18. Information on the height corresponding to the difference Θ between the phase θ and the phase $θ_R$ of the reference plane (Θ=θ−$θ_R$) is found through calculation. Alternatively, this is found from the table that has been found in advance in accordance with the technique for converting the total space into a table. The relationship between the phase difference Θ and the height h is given from FIG. 3 by Formula 19.

$$h = \frac{p\Theta z_R^2}{pz_R\Theta + 2\pi vd}$$ [Formula 19]

This operation is repeated by shifting the region by one pixel. When the height is found for every pixel, the form is measured.

Though the height h of the surface of an object relative to the reference plane is found using Formula 17 from a number of pixels that are aligned one-dimensionally, the height h of the surface of an object relative to the reference plane is found using Formula 19 from pixels that are aligned two-dimensionally in the same manner as using Formula 17.

Figure 9:
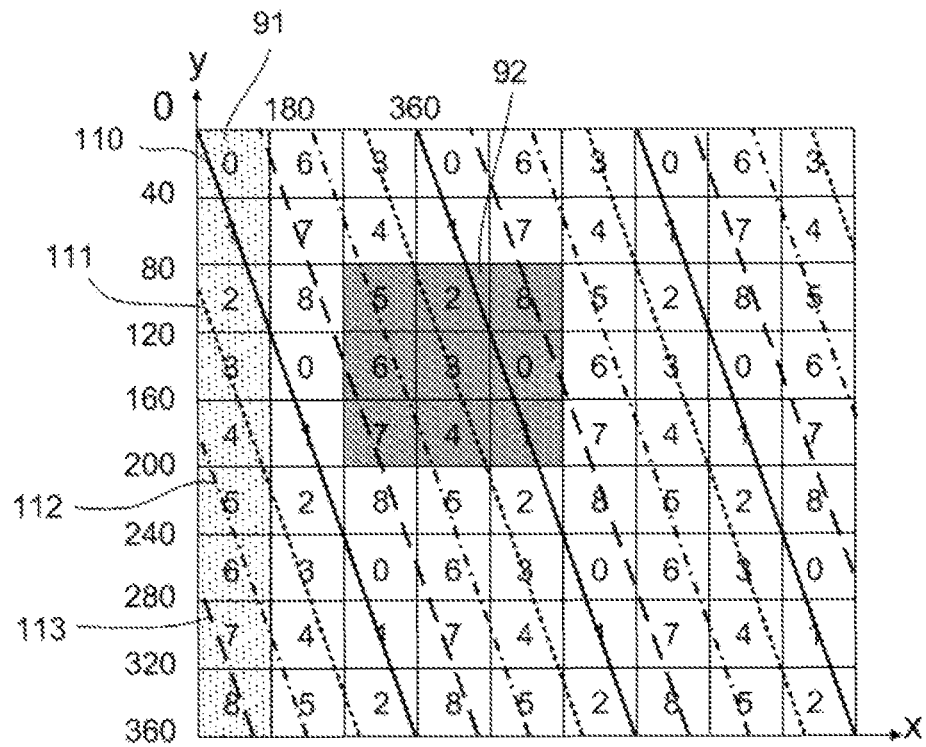
FIG. 9 is a diagram showing the grid image of Example 2 used in the present invention.

FIG. 9 is a diagram showing the image of Example 2 of the grid image used in the present invention. Though the direction of the grid is different from that in FIG. 8, the M (=9) pixels in the region 91 can be analyzed to find the phase in the same manner as in FIG. 8. The nine pixels in the region 92 (in the case of Nx=3 and Ny=3) can also be analyzed to gain the brightness data in the same manner, and the phase can also be gained by analyzing this data.

Figure 10:
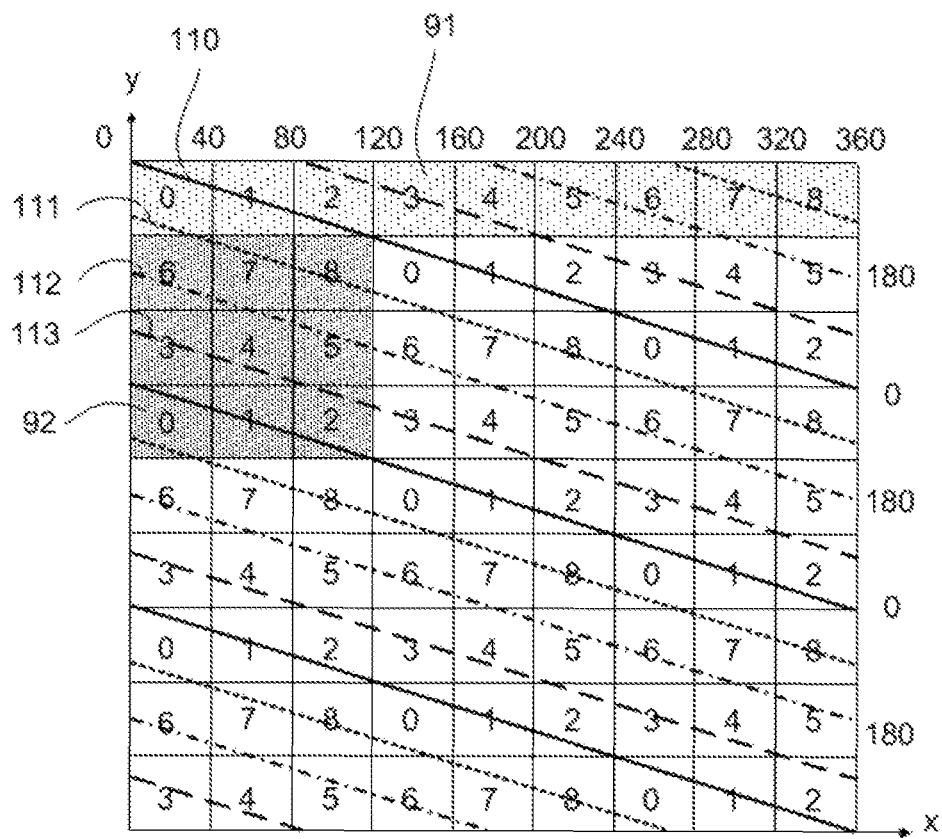
FIG. 10 is a diagram showing the grid image of Example 3 used in the present invention.

FIG. 10 is a diagram showing the image of Example 3 of the grid image used in the present invention. Though the direction of the grid is different from that in FIG. 8, the N (=9) pixels in the region 91 can be analyzed to find the phase in the same manner as in FIG. 8. The nine pixels in the region 92 (Nx=3 and Ny=3) can also be analyzed to gain the brightness data in the same manner, and the phase can also be gained by analyzing this data.

Figure 11:
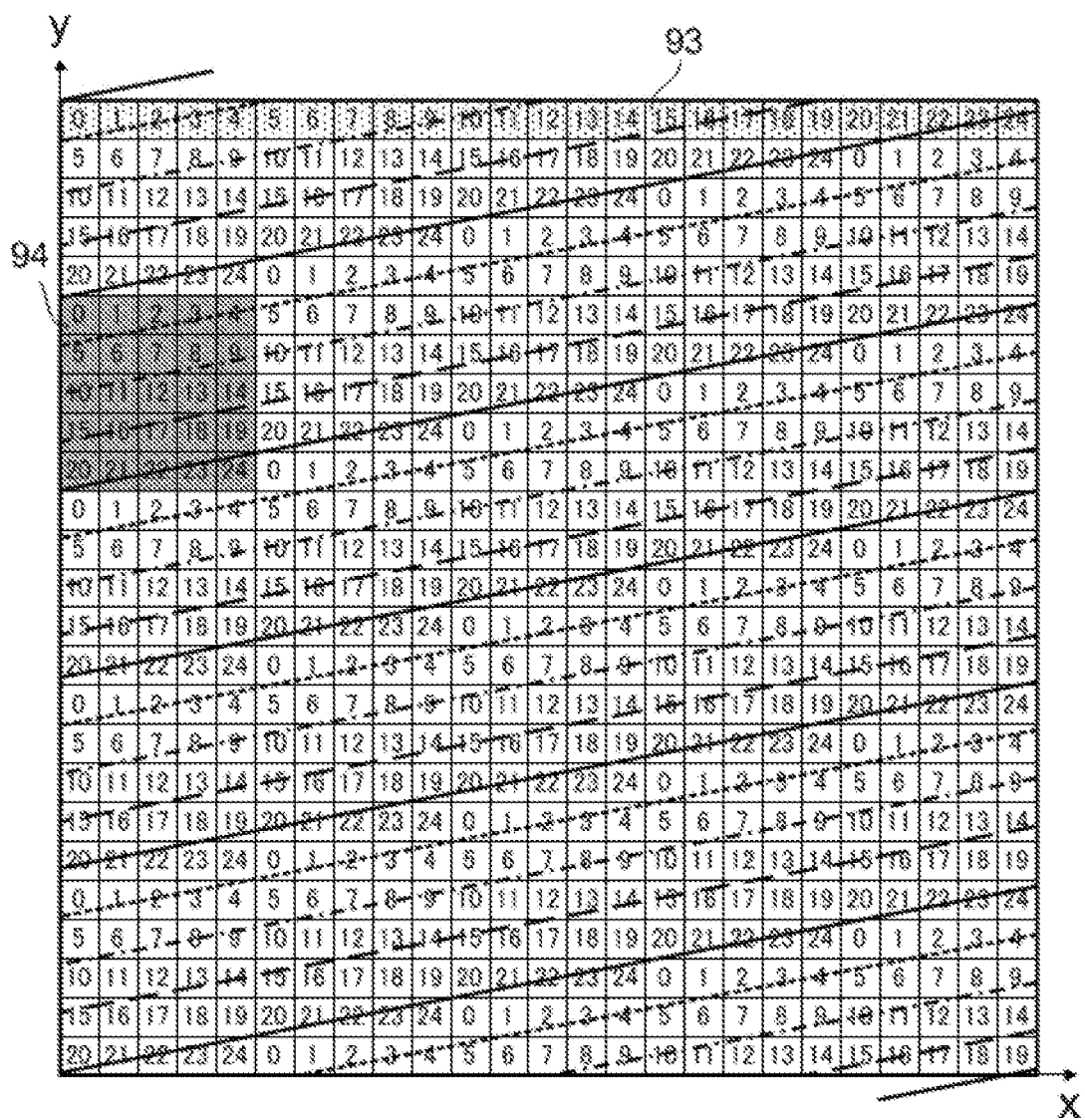
FIG. 11 is a diagram showing the grid image of Example 4 used in the present invention.

FIG. 11 is a diagram showing the image of Example 4 of the grid image used in the present invention. The M (=25) pixels in the region 93 can be analyzed to find the phase in the same manner as in FIG. 8. The 25 pixels in the region 94 (Nx=5 and Ny=5) can be analyzed to gain the brightness data in the same manner, and the phase can also be gained by analyzing this data.

Figure 12:
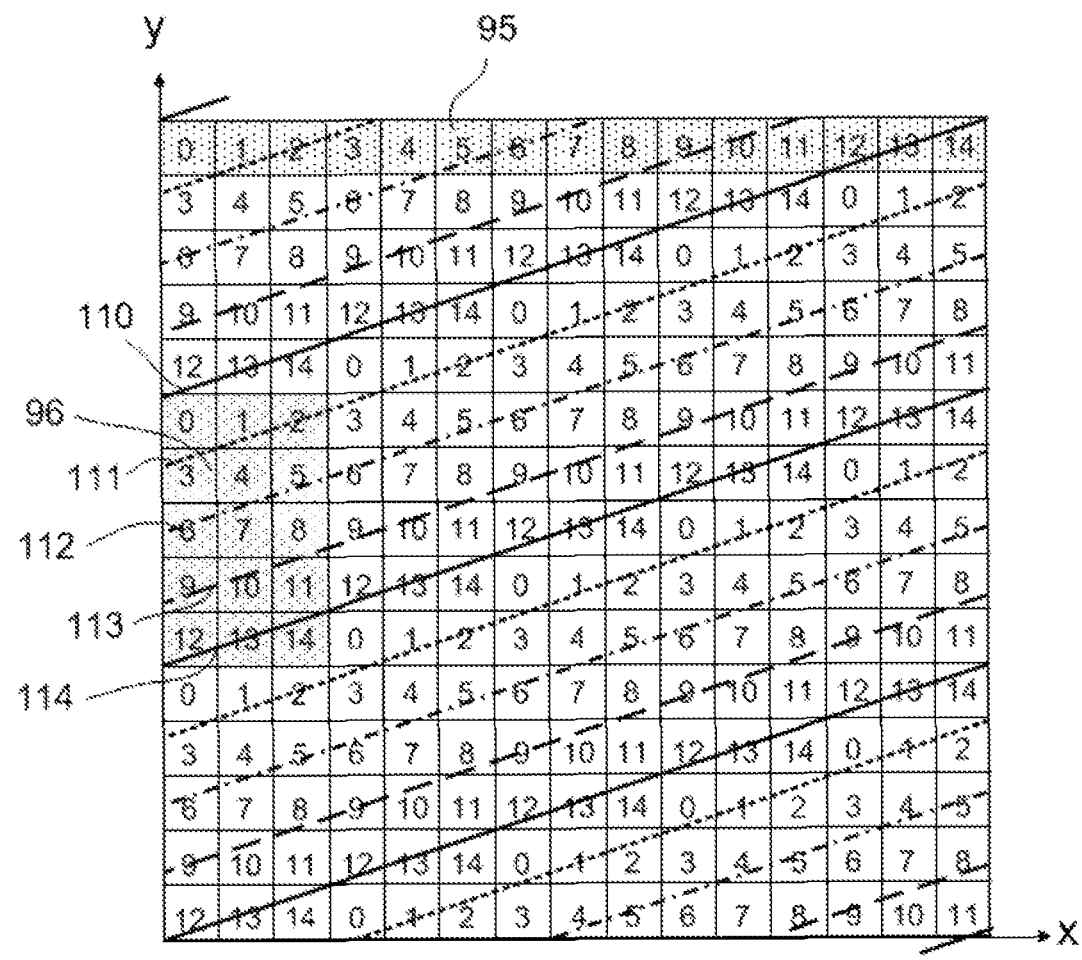
FIG. 12 is a diagram showing the grid image of Example 5 used in the present invention.

FIG. 12 is a diagram showing the image of Example 5 of the grid image used in the present invention. The M (=15) pixels in the region 95 can be analyzed to find the phase in the same manner as in FIG. 8. The 15 pixels in the region 96 (Nx=3 and Ny=5) can be analyzed to gain the brightness data in the same manner, and the phase can also be gained by analyzing this data. As shown in FIG. 12, the phase can also be found from a rectangular region.

Figure 13:
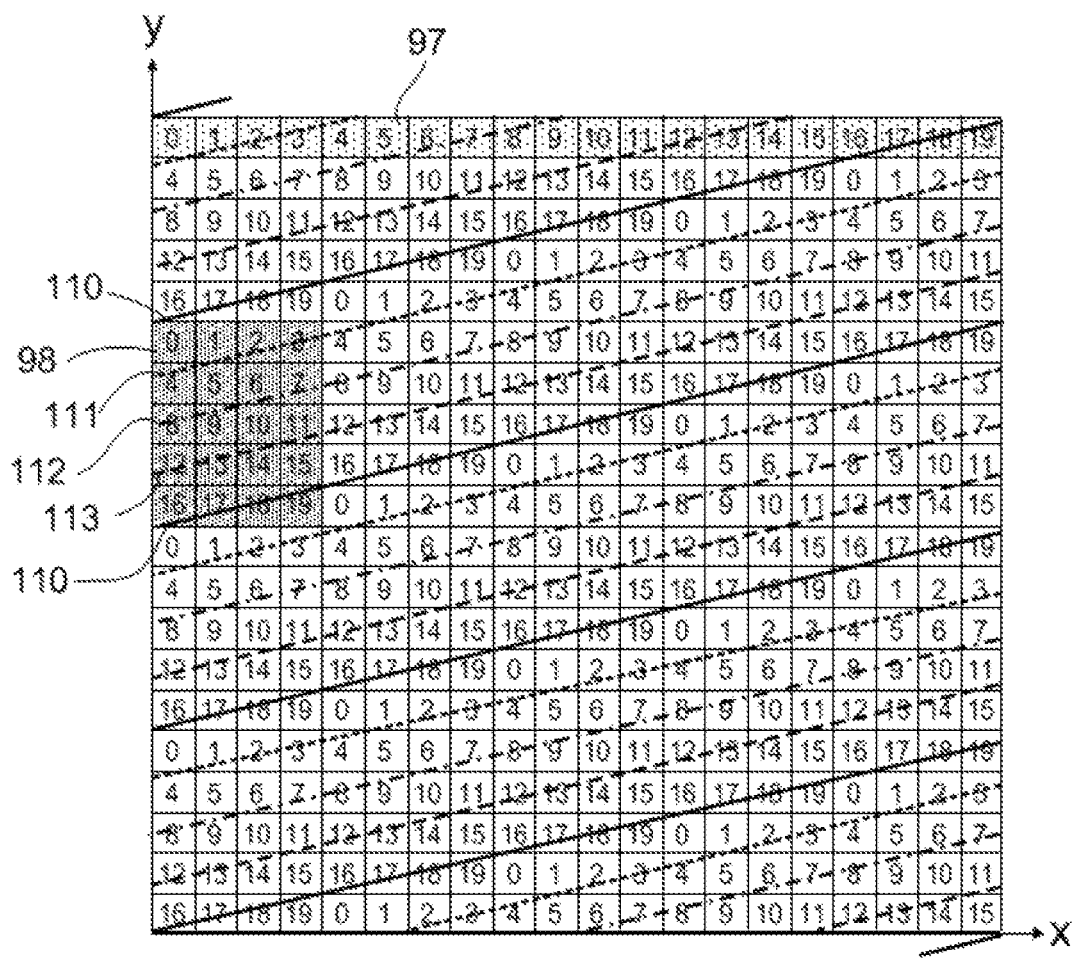
FIG. 13 is a diagram showing the grid image of Example 6 used in the present invention.

FIG. 13 is a diagram showing the image of Example 6 of the grid image used in the present invention. The M (=20) pixels in the region 97 can be analyzed to find the phase in the same manner as in FIG. 8. The 20 pixels in the region 98 (Nx=4 and Ny=5) can be analyzed to gain the brightness data in the same manner, and the phase can also be gained by analyzing this data.

Second Embodiment

The second embodiment relates to a form measurement method using a total space error table. Though the relationship between the phase and the height is found through calculation in the first embodiment, it is possible to find the phase of each pixel by using the technique for converting the total space into a table. Here, the technique for converting the total space into a table is a publicly-known technology as disclosed in Japanese Unexamined Patent Publication 2011-2378 (Wakayama University).

In accordance with the technique for converting the total space into a table, the relationship between the phase and the height (additionally, x, y and z coordinates) is found for each pixel in advance in order to gain a table. The height information can be gained simply by checking the table in the case where the phase is found. As a result, the calculation through triangulation becomes unnecessary, which makes the measurement very fast and an error originating from the optical system is cancelled by referring to the table, which makes the measurement with high precision.

The present invention is applied to a moire topography, and therefore, the relationship between the phase and the height can be gained from a theoretical formula, which is the same formula for all the pixels. However, reality does not match the theory due to an error in the optical system or the like where every pixel has an error.

Therefore, a total space error table where the ratio Q of the actually measured height to the theoretical height or the difference S between the actually measured height and the theoretical height are converted to a table is prepared so as to replace the total space table. A method for finding the height is gained by multiplying the theoretical height gained from the phase by the value Q in this table or by adding the theoretical height to S. This total space error table represents an error distribution for each pixel. It becomes easier to adjust the optical system when the data in this table is visualized and the optical system is adjusted so that the error becomes smaller.

Third Embodiment

As described above, according to the present invention, the image data in a rectangular region (including a square, typically 3×3 pixels) is used for phase analysis. In the third embodiment of the present invention, two types of grids having different pitches in the x direction are used for the same region so as to analyze the respective phases, from the results of which phase unwrapping is carried out, and thus, a phase analysis method having a wide dynamic range can be implemented.

Two or more types of waves having different frequencies in the x direction are put into pixels in a rectangular region (including a square) so that the respective waves are separated and sampled from the brightness data of the image in this region using Fourier transform or the like, and then the phases of these waves are found (in reality, Fourier transform may not be used, and instead values may be substituted into Formula 7 for finding the phase that corresponds to the frequency 1 in order to directly find the phase or a similar formula that corresponds to a higher frequency).

Phase unwrapping is carried out on the phases found for two or more waves so that a form measurement method having a wide dynamic range can be provided. In the first and second embodiments of the present invention, only a grid having one type of grid pitch in the x direction is projected, and therefore, the dynamic range is narrow. In accordance with the method of the present invention, two types of grids are projected at the same time so that a method for widening the dynamic range can be provided. The contents of this technology are described in the following.

Figure 14:
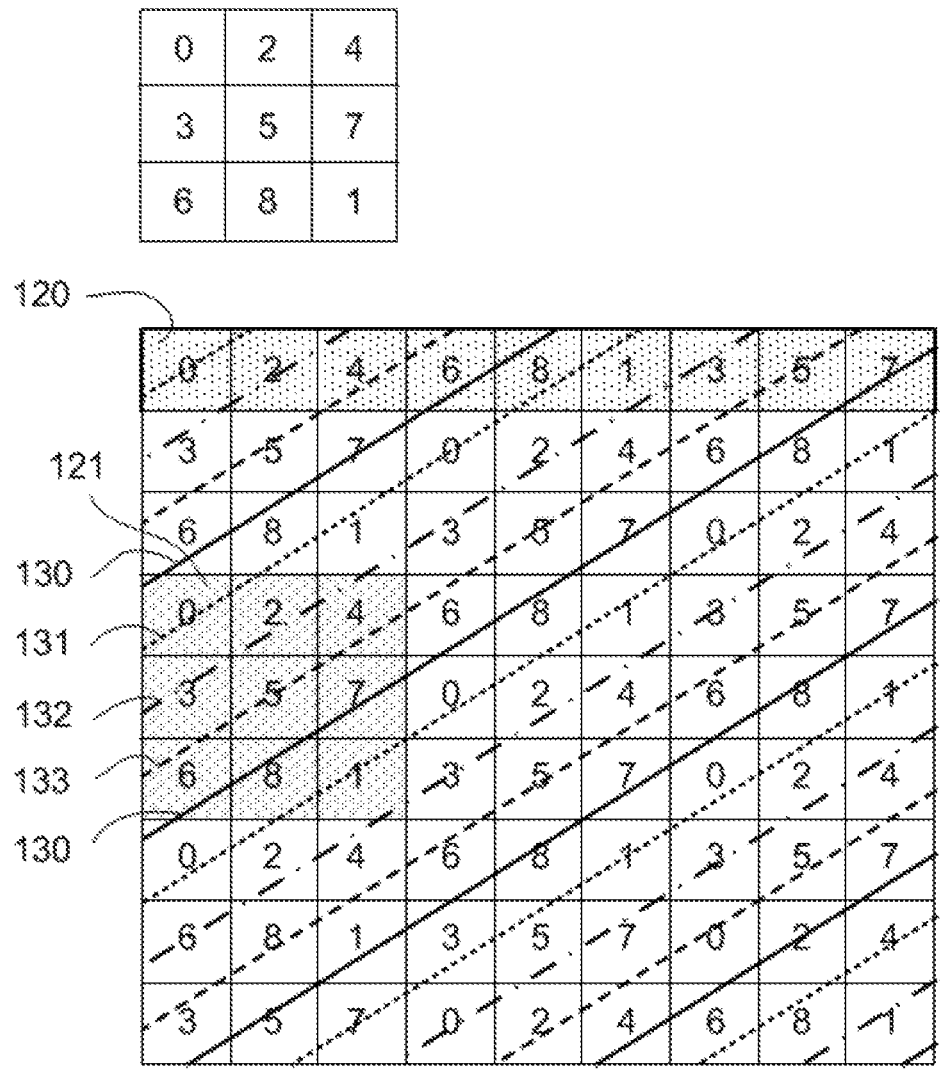
FIG. 14 is a diagram showing a projected grid with frequency 2.

FIG. 14 is a schematic diagram showing an image of a grid reflected on each pixel of a camera, where the smallest squares represent the size of one pixel and the diagonal lines represent the phases of the grid. The grid line 130 is a line of phase 0, the grid line 131 is a line of phase $\pi/2$, the grid line 132 is a line of phase $\pi$, and the grid line 133 is a line of phase $3\pi/2$. See the data of nine pixels along one lateral line shown in the region 120 so as to find that the phase increases as the pixel shifts to the next pixel and the phase changes by two periods over nine pixels.

In this case, see the region 121 of 3×3 pixels so as to find the same pieces of data aligned as of the three initial pixels in the region 120 of 9×1 pixels along the first line, the same pieces of data aligned as of the next three pixels along the second line and the same pieces of data aligned as of the next three pixels after that along the third line, and thus, the phases can be gained in the same manner whichever region 120 or 121 is analyzed.

Figure 15:
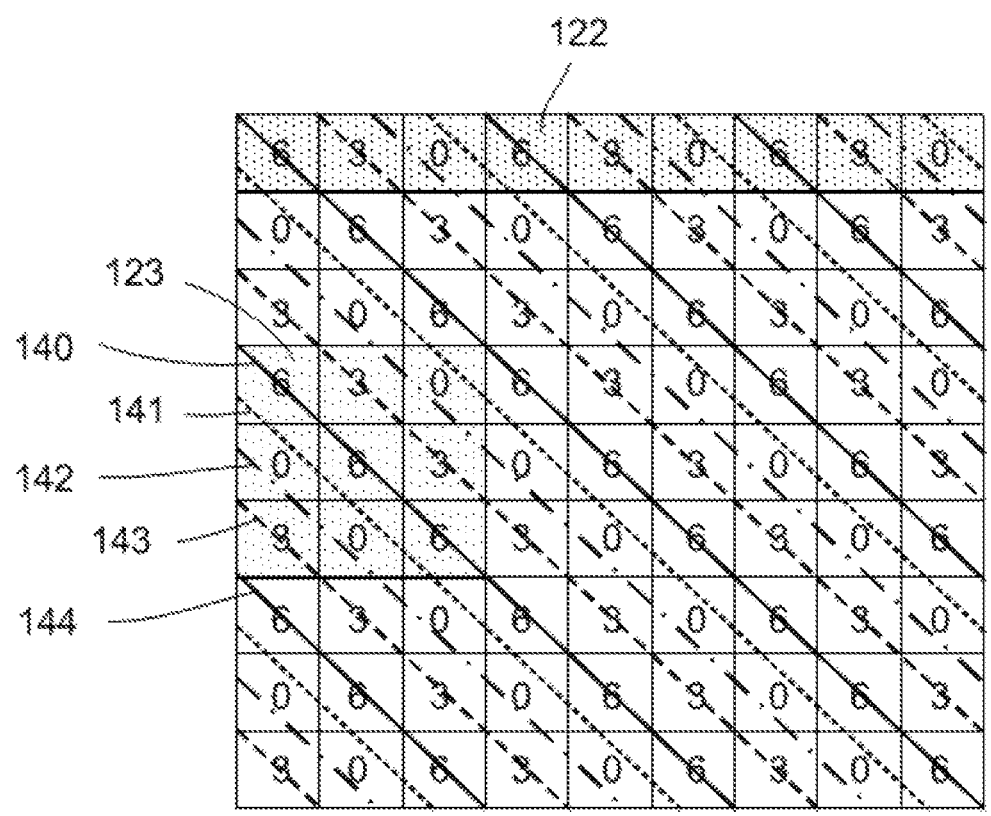
FIG. 15 is a diagram showing a projected grid with frequency −3.

In the case of FIG. 15, the period changes three times in the region 122. See the region 123 of 3×3 pixels so as to find the same pieces of data aligned as of the three initial pixels in the region 122 along the first line, the same pieces of data aligned as of the next three pixels along the second line and the same pieces of data aligned as of the next three pixels after that along the third line, and thus, the phases can be gained in the same manner whichever region 122 or the blue region is analyzed.

When a Fourier transform is carried out using the nine pieces of data in FIG. 14, only the frequency 2 or the frequency −2 exists. When a Fourier transform is carried out using the nine pieces of data in FIG. 15, only the frequency 3 or the frequency −3 exists.

Figure 16:
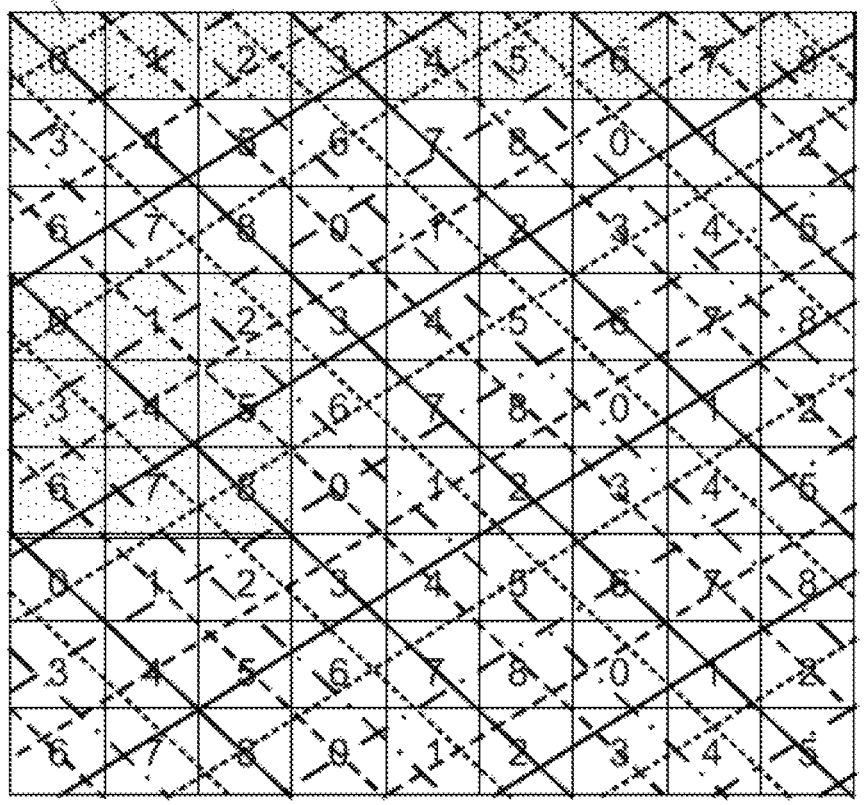
FIG. 16 shows a grid gained by synthesizing the grids with frequency 2 and with frequency −3 through the addition of FIGS. 14 and 15.

When the grid in FIG. 14 and the grid in FIG. 15 are overlapped (the brightness of each is added) so as to be projected as in FIG. 16, the grid of the frequency 2 and the grid of the frequency 3 are overlapped in the data in the region 124. When this image data is Fourier transformed, the components of the frequency 2 and the frequency 3 appear.

When the phases of these frequencies are analyzed, the phases of the respective waves can be gained. Phase unwrapping can be carried out on the phases of the two waves having different frequencies, and thus, analysis can be carried out in a widened range up to when the difference between the two phases becomes 2π.

Fourth Embodiment

The phase analysis method according to the present invention can be applied to the analysis of the deformation of an object. For example, one-dimensional microscopic deformation within a plane is assumed. In this case, there is a microscopic deformation without a deformation out of the plane, and therefore, it can be assumed that the pitch of the grid does not change and only the phase changes. When the pitch in the x direction is px and the amount of change in the phase is ΔΘ, the displacement u in the x direction is given in Formula 20.

$$u = -\frac{p\Delta\Theta}{2\pi}$$ [Formula 20]

The above-described amount of change in the phase can be found as follows. A grid is drawn on the object of which the deformation is to be measured. Then, an image of the drawn grid is taken. As for the means of taking an image, the above-described apparatus can be used.

The optical system is adjusted so that the phase of the drawn grid is gained by dividing 2mπ (m is an integer) by Nx×Ny (=M) (Nx and Ny are an integer of 2 or greater) in the rectangle made up of Nx pixels in the x direction and Ny pixels in the y direction in an image taken of the grid drawn on the above-described object.

In the rectangle made up of Nx pixels in the x direction and Ny pixels in the y direction in an image taken of the grid drawn on the object (Nx and Ny are an integer of 2 or greater), the brightness value is gained for the drawn grid of which the phase is gained by dividing 2mπ (m is an integer) by Nx×Ny. The thus-gained brightness value is used to calculate the phase in the above-described rectangle using Formula 18. The rectangular region is shifted by each pixel of the image taken of the grid drawn on the above-described object so that the phase can be found for each pixel.

Next, after the deformation of the object, an image of the changed pattern of the grid drawn on the object is taken. In a rectangular region of Nx×Ny pixels made up of Nx pixels in the x direction and Ny pixels in the y direction in an image of the pattern of the grid drawn on the above-described object after deformation, the brightness value is gained by dividing 2mπ by Nx×Ny. The thus-gained brightness value is used to calculate the phase in the above-described rectangle after deformation using Formula 18. The rectangular region is shifted by each pixel of an image taken of the grid pattern of the object after deformation so that the phase can be found for each pixel.

Thus, the displacement of the surface of the object can be calculated on the basis of the phase difference in each pixel before and after the deformation of the above-described object using Formula 20.

The surface of an object on which a grid is drawn is not limited to a plane. Displacement is measured in a plane on the surface of an object, and therefore, the surface of the object may be a curved surface.

EXPLANATION OF SYMBOLS

1 light source
2 grid
3 object
4 base
5 digital camera
6 image sensor
7 lens
8 computer
8a data table
8b recording medium
9 output unit
L location of light source
V center of camera lens
R point in reference plane
S point on surface of object
C point at which z axis and grid plane cross
E point of origin of grid
Q point at which light beam from light source towards point R passes through grid plane
G point at which light beam from light source towards point S passes through grid plane
B point at which point S on surface of object is projected vertically to z axis
P point at which light beam from light source to point R crosses line that is gained by projecting point S on surface of object vertically to z axis
I point at which point R in reference plane is projected vertically to z axis

The invention claimed is:

1. An apparatus for measuring a 3D form of an object on a reference plane of a moire topographic optical system comprising:
    a digital camera having a lens;
    a processor for processing data obtained by the camera to achieve the 3D form of the object in the moire topographic optical system, and
    a projector having a light source, wherein
        a height of a center of the lens of the digital camera and that of the light source of the projector are the same relative to the reference plane,
        an imaging plane of the digital camera and a grid plane of the projector on which a pattern of equally spaced parallel grid lines is drawn are parallel to the reference plane,
        an x direction of the moire topographic optical system is defined as that vertical to those of the grid lines and a y direction of the system is defined as that vertical to the x direction, so that coordinates (i, j) of pixels on the imaging plane are defined to be aligned in an i direction parallel to the x direction and in a j direction parallel to the y direction,
        a z direction is a height direction orthogonal to both of the x and y directions, wherein:
            the grid plane is adjusted so as to be projected on the reference plane as a diagonal grid pattern with respect to the x direction,
            a rectangular region including Nx pixels in the x direction and Ny pixels in the y direction (Nx and Ny are integers larger than or equal to 2) is extracted from a grid image taken in the imaging plane of the digital camera from the diagonal grid pattern projected on the reference plane, so that the phase of the projected grid is gained by dividing 2π by Nx×Ny within the rectangular region,
            a rectangular region including Nx pixels in the x direction and Ny pixels in the y direction (Nx and Ny are integers larger than or equal to 2) is extracted from a grid image taken in the imaging plane of the digital camera from the diagonal grid pattern projected on the object laid on the reference plane, so that all phases included in one pitch of the grid pattern are covered within the region including Nx×Ny pixels, M=Ny×Ny pieces of brightness data are taken out from the region including Nx×Ny pixels, and a phase analyzing process is carried out on each pixel on the basis of the pieces of brightness data.

2. A method for measuring a 3D form of an object on a reference plane of a moire topographic optical system wherein a height of a center of a lens of a digital camera and that of a light source of a projector are the same relative to the reference plane, an imaging plane of the camera and a grid plane of the projector on which a pattern of equally spaced parallel grid lines is drawn are parallel to the reference plane, an x direction of the system is defined as that vertical to those of the grid lines and a y direction of the system is defined as that vertical to the x direction, and hence coordinates (i, j) of pixels on the imaging plane are defined to be aligned in an i direction parallel to the x direction and in a j direction parallel to the y direction, and a z direction is a height direction orthogonal to both of the x and y directions, the method comprising:

adjusting the grid plane so as to be projected on the reference plane as a diagonal grid pattern with respect to the x direction, extracting a rectangular region including Nx pixels in the x direction and Ny pixels in the y direction (Nx and Ny are integers larger than or equal to 2) from a grid image taken in the imaging plane of the digital camera from the diagonal grid pattern projected on the reference plane, so that the phase of the projected grid is gained by dividing $2\pi$ by Nx×Ny within the rectangular region, extracting a rectangular region including Nx pixels in the x direction and Ny pixels in the y direction (Nx and Ny are integers larger than or equal to 2) from a grid image taken in the imaging plane of the digital camera from the diagonal grid pattern projected on the object laid on the reference plane, so that all phases included in one pitch of the grid pattern are covered within the region including Nx×Ny pixels, taking M=Nx×Ny pieces of brightness data out from the region including Nx×Ny pixels, and carrying out a phase analyzing process on each pixel on the basis of the taken pieces of brightness data.

3. A method for measuring a 3D form of an object on a reference plane of a moire topographic optical system in accordance with claim 2, wherein the taking out the pieces of brightness data is carried out by shifting the rectangular region for each pixel of the grid image taken in the imaging plane of the camera.

4. A method for measuring a 3D form of an object on a reference plane of a moire topographic optical system in accordance with claim 2, wherein the location of the surface of the object is found on the basis of said phase by using a technique for converting the entire space to a table.

5. A method for measuring a 3D form of an object on a reference plane of a moire topographic optical system in accordance with claim 2, further comprising providing one or more additional grids different in their pitch in the x or y direction, measuring a variation of phases included in one pitch of the additional grid, and carrying out phase unwrapping on the basis of the grids of different pitches.

6. A method for measuring a deformation of a surface of an object laid on a reference plane of a moire topographic optical system, wherein a height of a center of a lens of a digital camera and that of a light source of a projector are the same relative to the reference plane, an imaging plane of the camera is parallel to the reference plane, a pattern of equally spaced parallel grid lines is drawn preliminary on the surface of the object, an x direction of the system is defined as that vertical to those of the grid lines and a y direction of the system is defined as that vertical to the x direction, and hence coordinates (i, j) of pixels on the imaging plane are defined to be aligned in an i direction parallel to the x direction and in a j direction parallel to the y direction, and a z direction is a height direction orthogonal to both of the x and y directions, the method comprising:

adjusting the direction of the grid lines on the object laid on the reference plane with respect the x direction of the system in order to extract a rectangular region including Nx pixels in the x direction and Ny pixels in the y direction (Nx and Ny are integers larger than or equal to 2) from a grid image taken in the imaging plane of the digital camera from a diagonal grid pattern projected on the reference plane, so that the phase of the projected grid is gained by dividing $2\pi$ by Nx×Ny within the rectangular region, and to extract a rectangular region including Nx pixels in the x direction and Ny pixels in the y direction (Nx and Ny are integers larger than or equal to 2) from a grid image taken in the imaging plane of the digital camera from the grid pattern on the object laid on the reference plane so that all phases included in one pitch of the grid pattern are covered within the region including Nx×Ny pixels, taking the image of the grid pattern on the object before deformation, taking out M=Nx×Ny pieces of brightness data before deformation from the rectangular region, taking the image of the grid pattern on the object after deformation and taking out M=Nx×Ny pieces of brightness data after deformation from the rectangular region, carrying out a phase analyzing process on each pixel on the basis of the pieces of brightness data before and after deformation, and calculating a displacement of the object on the basis of the differences between phases before and after deformation.

7. A method for measuring a deformation of a surface of an object laid on a reference plane of a moire topographic optical system in accordance with claim 6, wherein, the taking out the pieces of brightness data is carried out by shifting the rectangular region for each pixel of the grid image taken in the imaging plane of the camera.

8. A method for measuring a 3D form of an object on a reference plane of a moire topographic optical system in accordance with claim 6, wherein the location of the surface of the object is found on the basis of said phase by using a technique for converting the entire space to a table.

9. A method for measuring a 3D form of an object on a reference plane of a moire topographic optical system in accordance with claim 6, further comprising providing one or more additional grids different in their pitch in x or y direction, measuring a variation of phases included in one pitch of the additional grid, and carrying out phase unwrapping on the basis of the grids of different pitches.

* * * * *